United States Patent
Nakamura 4,211,472
Jul. 8, 1980

[54] WIDE ANGLE OBJECTIVE LENS SYSTEM

[75] Inventor: Akiyoshi Nakamura, Sakai, Japan

[73] Assignee: Minolta Camera Kabushiki Kaisha, Sakai, Japan

[21] Appl. No.: 958,427

[22] Filed: Nov. 7, 1978

[30] Foreign Application Priority Data

Nov. 16, 1977 [JP] Japan .................................. 52-138101

[51] Int. Cl.² .............................................. G02B 11/30
[52] U.S. Cl. ................................................. 350/216
[58] Field of Search ................................. 350/215, 216

[56] References Cited

U.S. PATENT DOCUMENTS

| | | | |
|---|---|---|---|
| 3,132,199 | 5/1964 | Zimmerman | 350/216 |
| 3,492,064 | 1/1970 | Hoogland | 350/216 |
| 3,591,257 | 7/1971 | Mandler | 350/215 |
| 3,601,473 | 8/1971 | Mandler | 350/215 |

Primary Examiner—Conrad J. Clark
Attorney, Agent, or Firm—Jackson, Jones & Price

[57] ABSTRACT

A compact wide angle lens system for use in a camera having a range finder is provided. The lens system is of five-group, seven-element type comprising, consecutively from the object to the image side, a first lens group consisting of a negative meniscus single lens convex to the object side, a second lens group consisting of a positive doublet having a cementing surface concave to the object side, a third lens group consisting of a negative meniscus single lens concave to the object side, a fourth lens group consisting of a positive doublet, and a fifth lens group consisting of a negative meniscus single lens concave to the object side.

7 Claims, 16 Drawing Figures

—— Spherical Aberration   Astigmatism   Distortion
---- Sine Condition

——Spherical Aberration
----Sine Condition

Astigmatism

Distortion

FIG.5
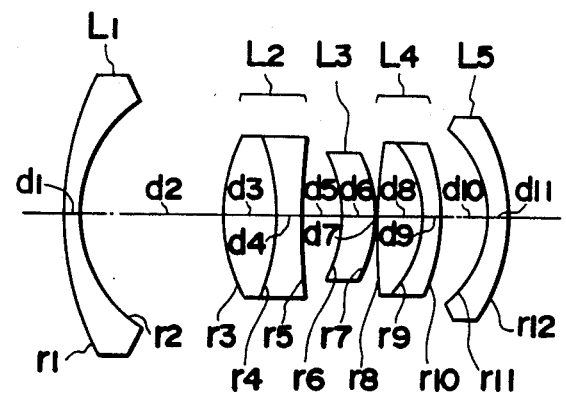
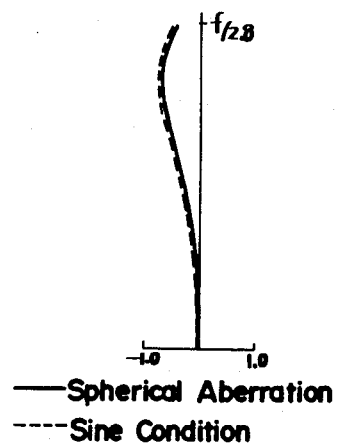
FIG.6a
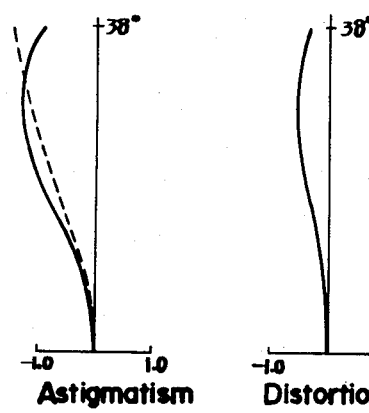
FIG.6b        FIG.6c
—— Spherical Aberration    Astigmatism    Distortion
---- Sine Condition FIG.8a — Spherical Aberration / Sine Condition
FIG.8b — Astigmatism
FIG.8c — Distortion

WIDE ANGLE OBJECTIVE LENS SYSTEM

BACKGROUND OF THE INVENTION

1. Field of the Invention

The present invention relates to a wide angle objective lens system for use in a camera having a range finder, and more particularly to a wide angle objective lens system of a type in which a lens component of positive refractive power is sandwiched in between a pair of outer lens components of negative refractive power.

2. Description of the Prior Art

Various wide angle objective lens systems of a type having a positive lens component sandwiched in between a pair of outer negative lens component have been suggested in the prior art such as that disclosed in the U.S. Pat. Nos. 3,132,199, 3,591,257 and 3,601,473.

There is still a demand in the prior art to provide a high quality wide angle objective lens system that can be economically manufactured. More particularly there is a demand to provide these features on a wide angle objective lens system having a compact size.

SUMMARY OF THE INVENTION

An object of the present invention is to provide a wide angle objective lens system of a type having a positive lens component sandwiched in between a pair of outer negative lens components in a compact size.

Another object of the present invention is to provide a wide angle objective lens system of the above mentioned type with an aperture ratio about 1/2.8, a field angle of about 76 degrees and a back focal distance of about 60 to 70 percent of the focal length of the system.

A still another object of the present invention is to provide an improved wide angle objective lens system for use in a camera having a range finder.

A further object of the present invention is to provide an improved wide angle objective lens system of the above mentioned type wherein the aberrations have been sufficiently corrected for commercial use.

The wide angle objective lens system of the present invention is of five-group, seven-element comprising, consecutively from the object to the image side, a first lens group consisting of a negative meniscus single lens convex to the object side, a second lens group consisting of a positive doublet having a cemented surface concave to the object side, a third lens group consisting of a negative meniscus single lens concave to the object side, a fourth lens group consisting of a positive doublet, and a fifth lens group consisting of a negative meniscus single lens concave to the object side, the system fulfilling the following conditions:

$0.70 < \phi_5/\phi_1 < 1.35$,
$0.15f < d_2 < 0.55f$,
$0.13 < N_2 - N_3 < 0.24$, and
$1.5f < r_5$.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE DRAWINGS

FIG. 5 is a schematic cross-sectional view of a third embodiment of the present invention;

FIGS. 6a, 6b and 6c are graphical plots of the aberrations of the third embodiment;

FIGS. 8a, 8b and 8c are graphical plots of the aberrations of the fourth embodiment.

DESCRIPTION OF THE PREFERRED EMBODIMENTS

Figure 1:
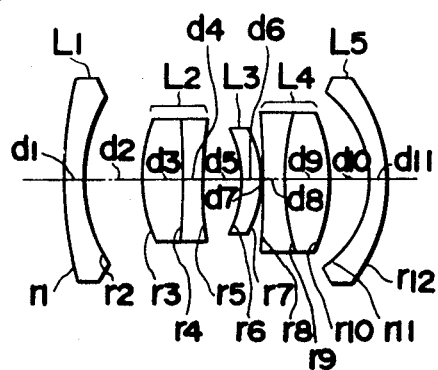
FIG. 1 is a schematic cross-sectional view of a first embodiment of the present invention.

The following description is provided to enable any person skilled in the optical art to make and use the invention and sets forth the best modes contemplated by the inventor of carrying out his invention. Various modifications, however, will remain readily apparent to those skilled in the art, since the generic principles of the present invention have been defined herein specifically to provide a wide angle objective lens system of a type having a positive component sandwiched in between a pair of outer negative components in a compact size.

The present invention represents the parameters of a compromise balance of acceptable aberrations in wide angle objective lens system for utilization with a 35 mm camera having a range finder.

In the accompanying drawings which supplement the following tables, the lenses in accordance with the present invention are illustrated diagrammatically. As usual, in conventional lens diagrams, light is assumed to travel from left to right. The individual lens groups are designated by the letter L with a subscript number corresponding to the consecutive numbers of the lens groups from image to object side. The radii of curvature of the lenses are indicated by r, with a subscript corresponding to consecutive numbers of the lens elements. The axial distances, d, along the optical axis are set forth both in the tables and in the drawings and include both the axial spacings between the lens elements and the thickness of the lens elements. Finally, the refractive index, N, and Abbe number, $\nu$, are provided in each of the tables. Since the specific lens parameters are provided herein to meet the requirements of a full disclosure adequate to convey the present invention to a lens designer, they should not be construed as limiting to any specific lens design as set forth in an individual embodiment.

Figure 3:
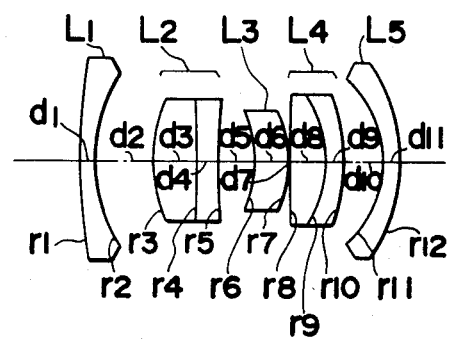
FIG. 3 is a schematic cross-sectional view of a second embodiment of the present invention.
Figure 7:
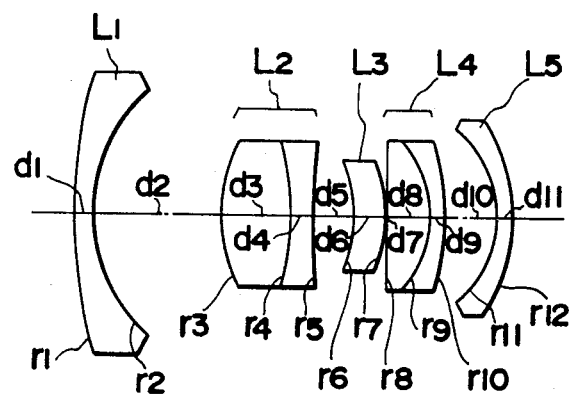
FIG. 7 is a schematical cross-sectional view of the fourth embodiment of the present invention.
Figure 7:
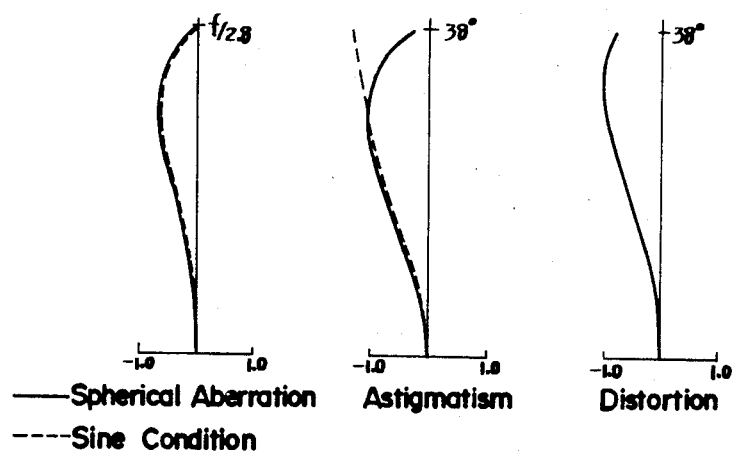

Four specific embodiments of the present invention are disclosed respectively in FIGS. 1, 3, 5, and 7. Each of these wide angle objective lens systems is of five-group, seven-element comprising, consecutively from the object of the image side, a first lens group $L_1$ consisting of a negative meniscus single lens convex to the object side, a second lens group $L_2$ consisting of a positive doublet having a cemented surface $r_4$ concave to the object side, a third lens group $L_3$ consisting of a negative meniscus single lens concave to the object side, a fourth lens group $L_4$ consisting of a positive doublet, and a fifth lens group $L_5$ consisting of a negative meniscus single lens concave to the object side.

The wide angle objective lens system fulfills the following conditions:

(1) $0.70 < \phi_5/\phi_1 < 1.35$;
(2) $0.15f < d_2 < 0.55f$;
(3) $0.13 < N_2-N_3 < 0.24$;
(4) $1.5f < r_5$ wherein $\phi_1$ represents a refractive power of the first lens group; $\phi_5$ represents a refractive power of the fifth lens group; $d_2$ represents an axial distance between the first and second lens groups; f represents the focal length of the whole lens system; $N_2$ and $N_3$ represent refractive indices of the object side and image side lens elements in the doublet of the second lens group, respectively; and $r_5$ represents a radius of curvature of the image side surface of the doublet of the second lens group.

The above mentioned condition (1) relates to a pair of outer lens groups $L_1$ and $L_5$ each having a negative refractive power, and defines a ratio of refractive power of the fifth lens group $L_5$ to that of first lens group $L_1$ for minimizing the various aberrations which would be increased when a wide angle lens system having a positive component sandwiched in between a pair of outer negative components is desired to be compact. In case that the ratio, $\phi_5/\phi_1$ increases beyond the upper limit, the field curvature may be difficult to be corrected because of an inevitably increased Petzval Sum although the desired compactness of the system would be attained. On the contrary, a bulkiness of the system may undesirably result if a well balanced aberration correction is sought with the ratio, $\phi_5/\phi_1$ below the lower limit.

Condition (2) is for balancing the corrections of astigmatism and coma. The value of $d_2$ below 0.55f is favorable to the compactness of the system desired. However, the balance of aberration correction may be broken and a necessary back focal distance of the system may be impossible to be attained in case $d_2$ is less than 0.15f.

Condition (3) means that the refractive power of the cemented surface $r_4$ in the second lens group $L_2$ is positive. This condition is for cancelling aberrations which are generated at the first lens group $L_1$ and for decreasing the Petzval Sum to improve the field curvature. If $(N_2-N_3)$ excessively increases beyond the upper limit, the correction of spherical aberration may be insufficient although it would be possible to decrease the Petzval Sum. On the other hand, the correction of distortion and negative coma may be insufficient and the spherical aberration may be excessively corrected.

Condition (4) is for correcting spherical aberration and balancing corrections of astigmatism and coma, and has a relation to the third lens group $L_3$. If condition (4) is violated, astigmatism may be negatively biased to deteriorate the field curvature. To recover the desirable field curvature, the third lens group $L_3$ may be required to have an excessive negative refractive power, which results in an additional generation of spherical aberration. Thus, it may be difficult to increase an aperture ratio.

The following Tables 1 to 4 show the first to fourth embodiments of the present invention, respectively.

Table 1

Embodiment 1
$f = 100.0 \quad F_{no} = 2.8 \quad 2\omega = 76°$

| | Radius of Curvature | Axial Distance | Refractive Index | Abbe Number |
|---|---|---|---|---|
| $L_1$ | $r_1 = 157.331$ | $d_1 = 5.50$ | $N_1 = 1.5346$ | $\nu_1 = 43.4$ |
| | $r_2 = 56.989$ | | | |
| | | $d_2 = 19.76$ | | |
| $L_2$ | $r_3 = 50.896$ | $d_3 = 15.02$ | $N_2 = 1.7745$ | $\nu_2 = 50.6$ |
| | $r_4 = -173.616$ | $d_4 = 5.75$ | $N_3 = 1.6158$ | $\nu_3 = 37.0$ |
| | $r_5 = 170.107$ | | | |
| | | $d_5 = 13.61$ | | |
| $L_3$ | $r_6 = -31.552$ | $d_6 = 7.08$ | $N_4 = 1.7043$ | $\nu_4 = 36.3$ |
| | $r_7 = -37.691$ | | | |
| | | $d_7 = 0.42$ | | |
| $L_4$ | $r_8 = -450.753$ | $d_8 = 6.23$ | $N_5 = 1.8074$ | $\nu_5 = 31.4$ |
| | $r_9 = 64.408$ | $d_9 = 16.48$ | $N_6 = 1.7830$ | $\nu_6 = 47.7$ |
| | $r_{10} = -60.187$ | | | |
| | | $d_{10} = 14.02$ | | |
| $L_5$ | $r_{11} = -33.494$ | $d_{11} = 5.50$ | $N_7 = 1.6169$ | $\nu_7 = 36.3$ |
| | $r_{12} = -58.576$ | | | |

Table 2

Embodiment 2
$f = 100.0 \quad F_{no} = 2.8 \quad 2\omega = 76°$

| | Radius of Curvature | Axial Distance | Refractive Index | Abbe Number |
|---|---|---|---|---|
| $L_1$ | $r_1 = 191.417$ | $d_1 = 5.50$ | $N_1 = 1.5814$ | $\nu_1 = 40.9$ |
| | $r_2 = 58.286$ | | | |
| | | $d_2 = 20.23$ | | |
| $L_2$ | $r_3 = 50.287$ | $d_3 = 15.32$ | $N_2 = 1.7725$ | $\nu_2 = 50.1$ |
| | $r_4 = -484.179$ | $d_4 = 6.02$ | $N_3 = 1.6129$ | $\nu_3 = 37.0$ |
| | $r_5 = 327.216$ | | | |
| | | $d_5 = 13.61$ | | |
| $L_3$ | $r_6 = -35.164$ | $d_6 = 12.00$ | $N_4 = 1.6200$ | $\nu_4 = 36.3$ |
| | $r_7 = -42.542$ | | | |
| | | $d_7 = 0.42$ | | |
| $L_4$ | $r_8 = -810.58$ | $d_8 = 12.00$ | $N_5 = 1.7810$ | $\nu_5 = 44.8$ |
| | $r_9 = -35.001$ | $d_9 = 5.95$ | $N_6 = 1.8052$ | $\nu_6 = 25.2$ |
| | $r_{10} = -70.196$ | | | |
| | | $d_{10} = 14.02$ | | |
| $L_5$ | $r_{11} = -33.895$ | $d_{11} = 5.50$ | $N_7 = 1.6200$ | $\nu_7 = 36.3$ |
| | $r_{12} = -61.002$ | | | |

Table 3

Embodiment 3
$f = 100.0 \quad F_{no} = 2.8 \quad 2\omega = 76°$

| | Radius of Curvature | Axial Distance | Refractive Index | Abbe Number |
|---|---|---|---|---|
| $L_1$ | $r_1 = 106.023$ | $d_1 = 5.50$ | $N_1 = 1.6200$ | $\nu_1 = 36.3$ |
| | $r_2 = 44.247$ | | | |
| | | $d_2 = 48.86$ | | |
| $L_2$ | $r_3 = 56.604$ | $d_3 = 19.00$ | $N_2 = 1.7495$ | $\nu_2 = 50.4$ |
| | $r_4 = -74.197$ | $d_4 = 8.00$ | $N_3 = 1.5407$ | $\nu_3 = 46.9$ |
| | $r_5 = 271.409$ | | | |
| | | $d_5 = 14.00$ | | |
| $L_3$ | $r_6 = -43.670$ | $d_6 = 11.00$ | $N_4 = 1.6200$ | $\nu_4 = 36.3$ |
| | $r_7 = -49.934$ | | | |
| | | $d_7 = 0.52$ | | |

Table 3-continued

Embodiment 3
$f = 100.0 \quad F_{no} = 2.8 \quad 2\omega = 76°$

| | Radius of Curvature | Axial Distance | Refractive Index | Abbe Number |
|---|---|---|---|---|
| $L_4$ | $r_8 = 340.221$ | | | |
| | | $d_8 = 16.00$ | $N_5 = 1.4875$ | $\nu_5 = 69.9$ |
| | $r_9 = -35.042$ | | | |
| | | $d_9 = 6.00$ | $N_6 = 1.8052$ | $\nu_6 = 25.2$ |
| | $r_{10} = -61.699$ | | | |
| | | $d_{10} = 17.00$ | | |
| $L_5$ | $r_{11} = -34.746$ | | | |
| | | $d_{11} = 5.50$ | $N_7 = 1.6200$ | $\nu_7 = 36.3$ |
| | $r_{12} = -58.256$ | | | |

Table 4

Embodiment 4
$f = 100.0 \quad F_{no} = 2.8 \quad 2\omega = 76°$

| | Radius of Curvature | Axial Distance | Refractive Index | Abbe Number |
|---|---|---|---|---|
| $L_1$ | $r_1 = 162.731$ | | | |
| | | $d_1 = 5.50$ | $N_1 = 1.5404$ | $\nu_1 = 51.0$ |
| | $r_2 = 52.892$ | | | |
| | | $d_2 = 45.20$ | | |
| $L_2$ | $r_3 = 59.180$ | | | |
| | | $d_3 = 23.18$ | $N_2 = 1.7725$ | $\nu_2 = 50.1$ |
| | $r_4 = -102.339$ | | | |
| | | $d_4 = 8.00$ | $N_3 = 1.6129$ | $\nu_3 = 37.0$ |
| | $r_5 = 321.316$ | | | |
| | | $d_5 = 14.00$ | | |
| $L_3$ | $r_6 = -43.340$ | | | |
| | | $d_6 = 11.00$ | $N_4 = 1.6200$ | $\nu_4 = 36.3$ |
| | $r_7 = -51.046$ | | | |
| | | $d_7 = 0.52$ | | |
| $L_4$ | $r_8 = -753.97$ | | | |
| | | $d_8 = 14.00$ | $N_5 = 1.7106$ | $\nu_5 = 43.2$ |
| | $r_9 = -34.327$ | | | |
| | | $d_9 = 6.00$ | $N_6 = 1.8052$ | $\nu_6 = 25.2$ |
| | $r_{10} = -75.827$ | | | |
| | | $d_{10} = 18.00$ | | |
| $L_5$ | $r_{11} = -34.832$ | | | |
| | | $d_{11} = 5.50$ | $N_7 = 1.6166$ | $\nu_7 = 36.7$ |
| | $r_{12} = -54.510$ | | | |

Figures 2A, 2B, 2C:
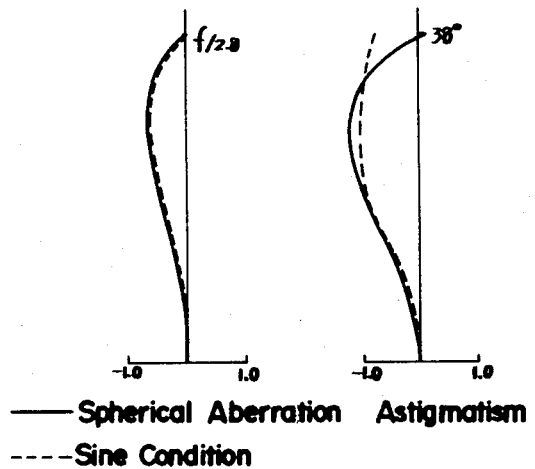
FIGS. 2a, 2b and 2c are respectively graphical plots of the abberations of the first embodiment.
Figure 4A:
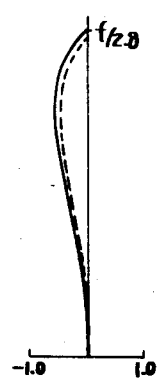
FIGS. 4a, 4b and 4c are graphical plots of the abberations of the second embodiment.
Figure 4B:
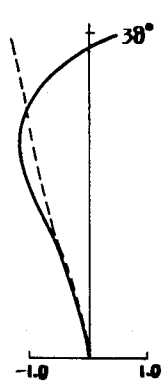
Figure 4C:
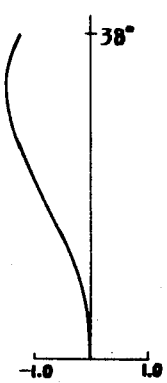

In the above tables the spherical aberration, sine condition, astigmatism and distortion are plotted for each of the four embodiments in respectively FIGS. 2, 4, 6, and 8.

By adhering to the parameters and design considerations set forth in the above specification, a lens designer in the optical field is capable of providing a wide angle objective lens system. While the parameters of the present invention can be found in the above examples, the examples should not be considered limiting but rather illustrative of the advantages of the present invention. Accordingly, the parameters of the present invention should be measured solely from the following claims.

What is claimed is:

1. A wide angle objective lens system of five-group, seven-elements comprising, consecutively from the object to the image side:
   a first lens group consisting of a negative meniscus single lens convex to the object side;
   a second lens group consisting of a positive doublet having a cemented surface concave to the object side;
   a third lens group consisting of a negative meniscus single lens concave to the object side;
   a fourth lens group consisting of a positive doublet; and
   a fifth lens group consisting of a negative meniscus single lens concave to the object side.

2. The invention of claim 1, wherein the wide angle objective lens system fulfills the following conditions:
   $0.70 < \phi_5/\phi_1 < 1.35$;
   $0.15f < d_2 < 0.55f$;
   $0.13 < N_2 - N_3 < 0.24$;
   $1.5f < r_5$
wherein:
   $\phi_1$ represents a refractive power of the first lens group;
   $\phi_5$ represents a refractive power of the fifth lens group;
   $d_2$ represents an axial distance between the first and second lens groups;
   f represents the focal length of the whole lens system;
   $N_2$ and $N_3$ represent refractive indices of the object side and image side lens elements in the doublet of the second lens group, respectively; and
   $r_5$ represents a radius of curvature of the image side surface of the doublet of the second lens group.

3. A wide angle objective lens system comprising the following design parameters;

$f = 100.0 \quad F_{no} = 2.8 \quad 2\omega = 76°$

| | Radius of Curvature | Axial Distance | Refractive Index | Abbe Number |
|---|---|---|---|---|
| $L_1$ | $r_1 = 157.331$ | | | |
| | | $d_1 = 5.50$ | $N_1 = 1.5346$ | $\nu_1 = 43.4$ |
| | $r_2 = 56.989$ | | | |
| | | $d_2 = 19.76$ | | |
| $L_2$ | $r_3 = 50.896$ | | | |
| | | $d_3 = 15.02$ | $N_2 = 1.7745$ | $\nu_2 = 50.6$ |
| | $r_4 = -173.616$ | | | |
| | | $d_4 = 5.75$ | $N_3 = 1.6158$ | $\nu_3 = 37.0$ |
| | $r_5 = 170.107$ | | | |
| | | $d_5 = 13.61$ | | |
| $L_3$ | $r_6 = -31.552$ | | | |
| | | $d_6 = 7.08$ | $N_4 = 1.7043$ | $\nu_4 = 36.3$ |
| | $r_7 = -37.691$ | | | |
| | | $d_7 = 0.42$ | | |
| $L_4$ | $r_8 = -450.753$ | | | |
| | | $d_8 = 6.23$ | $N_5 = 1.8074$ | $\nu_5 = 31.4$ |
| | $r_9 = 64.408$ | | | |
| | | $d_9 = 16.48$ | $N_6 = 1.7830$ | $\nu_6 = 47.7$ |
| | $r_{10} = -60.187$ | | | |
| | | $d_{10} = 14.02$ | | |
| $L_5$ | $r_{11} = -33.494$ | | | |
| | | $d_{11} = 5.50$ | $N_7 = 1.6169$ | $\nu_7 = 36.3$ |
| | $r_{12} = -58.576$ | | | |

4. A wide angle objective lens system comprising the following design parameters;

$f = 100.0 \quad F_{no} = 2.8 \quad 2\omega = 76°$

| | Radius of Curvature | Axial Distance | Refractive Index | Abbe Number |
|---|---|---|---|---|
| $L_1$ | $r_1 = 191.417$ | | | |
| | | $d_1 = 5.50$ | $N_1 = 1.5814$ | $\nu_1 = 40.9$ |
| | $r_2 = 58.286$ | | | |
| | | $d_2 = 20.23$ | | |
| $L_2$ | $r_3 = 50.287$ | | | |
| | | $d_3 = 15.32$ | $N_2 = 1.7725$ | $\nu_2 = 50.1$ |
| | $r_4 = 484.179$ | | | |
| | | $d_4 = 6.02$ | $N_3 = 1.6129$ | $\nu_3 = 37.0$ |
| | $r_5 = 327.216$ | | | |
| | | $d_5 = 13.61$ | | |
| $L_3$ | $r_6 = -35.164$ | | | |
| | | $d_6 = 12.00$ | $N_4 = 1.6200$ | $\nu_4 = 36.3$ |
| | $r_7 = -42.542$ | | | |
| | | $d_7 = 0.42$ | | |

-continued

| | $f = 100.0 \quad F_{no} = 2.8 \quad 2\omega = 76°$ | | | |
|---|---|---|---|---|
| | Radius of Curvature | Axial Distance | Refractive Index | Abbe Number |
| $L_4$ | $r_8 = -810.58$ | $d_8 = 12.00$ | $N_5 = 1.7810$ | $\nu_5 = 44.8$ |
| | $r_9 = -35.001$ | $d_9 = 5.95$ | $N_6 = 1.8052$ | $\nu_6 = 25.2$ |
| | $r_{10} = -70.196$ | $d_{10} = 14.02$ | | |
| $L_5$ | $r_{11} = -33.895$ | $d_{11} = 5.50$ | $N_7 = 1.6200$ | $\nu_7 = 36.3$ |
| | $r_{12} = -61.002$ | | | |

5. A wide angle objective lens system comprising the following design parameters;

| | $f = 100.0 \quad F_{no} = 2.8 \quad 2\omega = 76°$ | | | |
|---|---|---|---|---|
| | Radius of Curvature | Axial Distance | Refractive Index | Abbe Number |
| $L_1$ | $r_1 = 106.023$ | $d_1 = 5.50$ | $N_1 = 1.6200$ | $\nu_1 = 36.3$ |
| | $r_2 = 44.247$ | $d_2 = 48.86$ | | |
| $L_2$ | $r_3 = 56.604$ | $d_3 = 19.00$ | $N_2 = 1.7495$ | $\nu_2 = 50.4$ |
| | $r_4 = -74.197$ | $d_4 = 8.00$ | $N_3 = 1.5407$ | $\nu_3 = 46.9$ |
| | $r_5 = 271.409$ | $d_5 = 14.00$ | | |
| $L_3$ | $r_6 = -43.670$ | $d_6 = 11.00$ | $N_4 = 1.6200$ | $\nu_4 = 36.3$ |
| | $r_7 = -49.934$ | $d_7 = 0.52$ | | |
| $L_4$ | $r_8 = 340.221$ | $d_8 = 16.00$ | $N_5 = 1.4875$ | $\nu_5 = 69.9$ |
| | $r_9 = -35.042$ | $d_9 = 6.00$ | $N_6 = 1.8052$ | $\nu_6 = 25.2$ |
| | $r_{10} = -61.699$ | $d_{10} = 17.00$ | | |
| $L_5$ | $r_{11} = -34.746$ | $d_{11} = 5.50$ | $N_7 = 1.6200$ | $\nu_7 = 36.3$ |
| | $r_{12} = -58.256$ | | | |

6. A wide angle objective lens system comprising the following design parameters;

| | $f = 100.0 \quad F_{no} = 2.8 \quad 2\omega = 76°$ | | | |
|---|---|---|---|---|
| | Radius of Curvature | Axial Distance | Refractive Index | Abbe Number |
| $L_1$ | $r_1 = 162.731$ | $d_1 = 5.50$ | $N_1 = 1.5404$ | $\nu_1 = 51.0$ |
| | $r_2 = 52.892$ | $d_2 = 45.20$ | | |
| $L_2$ | $r_3 = 59.180$ | $d_3 = 23.18$ | $N_2 = 1.7725$ | $\nu_2 = 50.1$ |
| | $r_4 = -102.339$ | $d_4 = 8.00$ | $N_3 = 1.6129$ | $\nu_3 = 37.0$ |
| | $r_5 = 321.316$ | $d_5 = 14.00$ | | |
| $L_3$ | $r_6 = -43.340$ | $d_6 = 11.00$ | $N_4 = 1.6200$ | $\nu_1 = 36.3$ |
| | $r_7 = -51.046$ | $d_7 = 0.52$ | | |
| $L_4$ | $r_8 = -753.97$ | $d_8 = 14.00$ | $N_5 = 1.7106$ | $\nu_5 = 43.2$ |
| | $r_9 = 34.327$ | $d_9 = 6.00$ | $N_6 = 1.8052$ | $\nu_6 = 25.2$ |
| | $r_{10} = -75.827$ | $d_{10} = 18.00$ | | |
| $L_5$ | $r_{11} = -34.832$ | $d_{11} = 5.50$ | $N_7 = 1.6166$ | $\nu_7 = 36.7$ |
| | $r_{12} = -54.150$ | | | |

7. A compact wide angle objective lens system comprising, consecutively from the object to the image side of the lens system;
a first negative lens;
a first positive doublet;
a second negative lens;
a second positive doublet, and
a third negative lens, wherein the wide angle objective lens system fulfills the following conditions:
$0.70 < \phi_5/\phi_1 < 1.35$;
$0.15f < d_2 < 0.55f$;
$0.13 < N_2 - N_3 < 0.24$;
$1.5f < r_5$
wherein:
$\phi_1$ represents a refractive power of the first negative lens;
$\phi_5$ represents a refractive power of the third negative lens;
$d_2$ represents an axial distance between the first lens and the first doublet;
f represents the focal length of the whole lens system;
$N_2$ and $N_3$ represent the refractive indices of the object side and image side lens elements in the first doublet respectively; and
$r_5$ represents a radius of curvature of the image side surface of the first doublet.

* * * * *

UNITED STATES PATENT AND TRADEMARK OFFICE
CERTIFICATE OF CORRECTION

PATENT NO. : 4,211,472
DATED : July 8, 1980
INVENTOR(S) : Akiyoshi Nakamura

It is certified that error appears in the above—identified patent and that said Letters Patent is hereby corrected as shown below:

Column 4, line 24, delete "$N_7 = \text{1.6169}$" and insert --$N_7 = 1.6169$--.

Column 6, line 63 delete "$r_4 = 484.179$" and insert --$r_4 = -484.179$--.

Column 8, line 14, delete "$\nu_1 = 36.3$" and insert --$\nu_4 = 36.3$--.

Column 8, line 17, delete "$r_9 = 34.327$" and insert --$r_9 = -34.327$--.

Signed and Sealed this

Twenty-eighth Day of October 1980

[SEAL]

Attest:

SIDNEY A. DIAMOND

Attesting Officer

Commissioner of Patents and Trademarks